Figure 1:
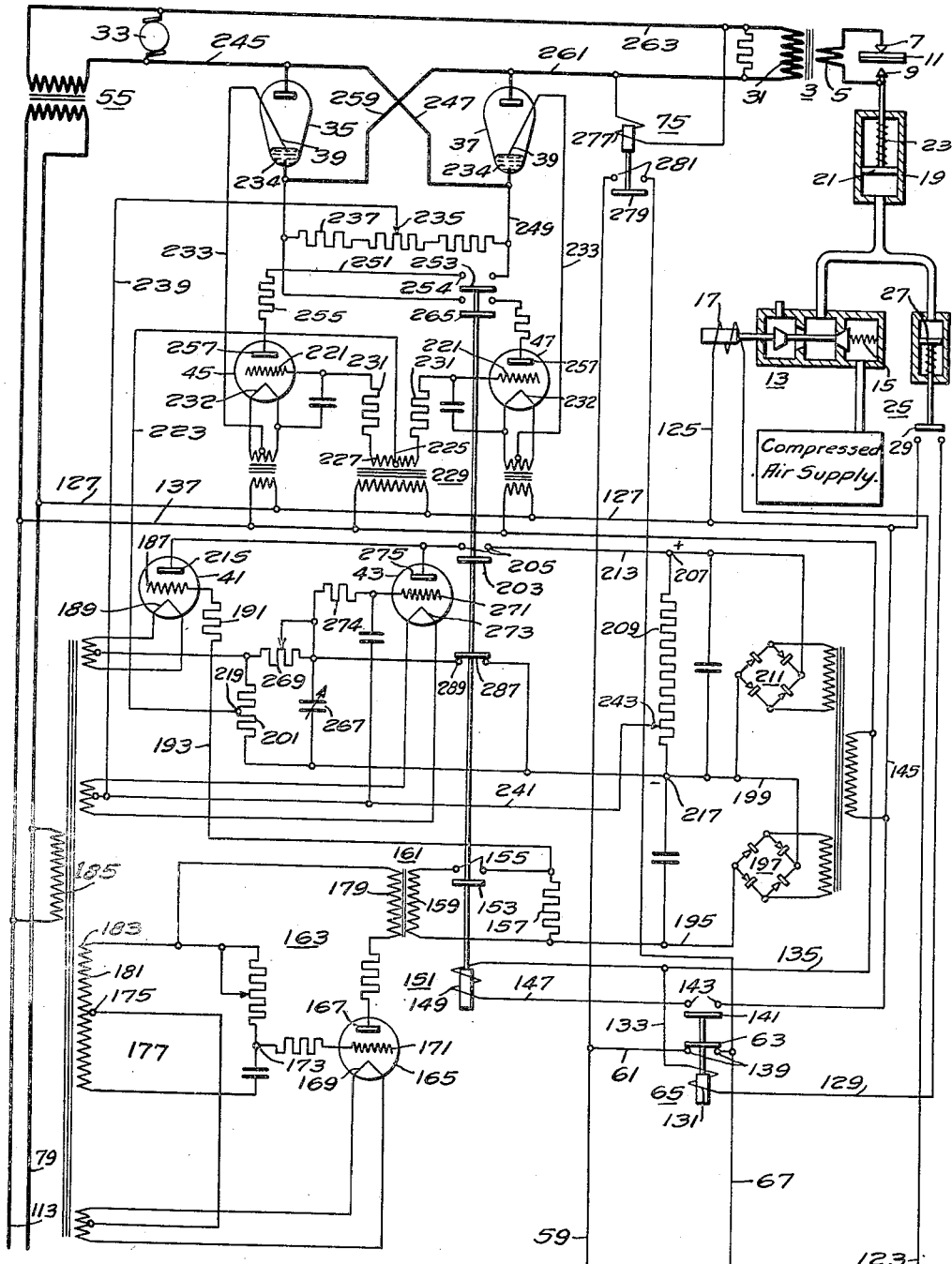

Patented Aug. 6, 1940

2,210,709

UNITED STATES PATENT OFFICE 2,210,709

CONTROL APPARATUS

John W. Dawson, Auburndale, Mass., assignor to Westinghouse Electric & Manufacturing Company, East Pittsburgh, Pa., a corporation of Pennsylvania Application May 7, 1938, Serial No. 206,642

14 Claims. (Cl. 219—4)

My invention relates to control apparatus and has particular relation to apparatus for controlling resistance welding systems.

A welding system of the type in use in industry at present ordinarily comprises a pair of welding electrodes, one or both of which are urged into engagement with the material to be welded by the application of fluid pressure. After the electrodes are thus engaged with the material, welding current is applied. The welding current flows for a short interval of time and is then discontinued. After this the electrodes are disengaged from the material by exhausting the fluid producing the pressure and the material is advanced in preparation for another welding operation.

In welding apparatus of the type just described, it is, of course, essential that the electrodes shall remain in engagement with the material to be welded until the welding current has completely ceased to flow and the melted or softened metal at the weld has chilled and hardened. If the welding electrodes are disengaged from the material while welding current is still flowing, arcing takes place and the material is badly burned. If the welding electrodes are disengaged while the metal is still soft the stresses present in the welded material partially rupture the weld metal and cause weak welds. While some delay is thus necessary it is essential that the welding progress at the greatest possible speed and therefore the minimum time consistent with the production of high quality welds should be consumed in electrode dwell after a welding operation.

In accordance with the teachings of the prior art, the problem involved in this connection was solved by providing a switching mechanism responsive to the flow of the welding current pulses for the fluid-pressure control valve. The switching mechanism was electromagnetically actuated and, therefore, required a current pulse of at least a predetermined length to produce operation. It happened, therefore, that for short welding pulses the mechanism failed to operate altogether and, therefore, fluid pressure was removed at an improper time.

It is accordingly an object of my invention to provide apparatus for controlling a welding system wherein the welding electrodes will be engaged with and disengaged from the material to be welded at the precisely proper time regardless of the length of the welding pulses.

Another object of my invention is to provide a welding system incorporating fluid pressure means for moving the electrodes into and out of engagement with the material to be welded wherein the valve provided for the application and release of the fluid pressure shall be so controlled that the electrodes shall at all times be moved into and out of engagement with the material to be welded at precisely the proper instant.

A further object of my invention is to provide a control system incorporating a plurality of electromagnetic relay elements that shall so cooperate that the actuation of one of said elements shall depend in a precise manner on the flow of current pulses through another of the elements.

More concisely stated, it is an object of my invention to provide a resistance welding system in which the current flowing through the material to be welded shall be of precisely the desired magnitude and shall persist for a precisely predetermined time interval and the welding electrodes shall remain in engagement with the metal for just sufficient time to enable the metal to properly chill and harden.

According to my invention, the fluid pressure valve is electromagnetically actuated. The movement of the welding electrodes relative to the material to be welded is precisely controlled by energizing and deenergizing the valve solenoid at the proper instants. For this purpose, a time delay relay is provided. The relay requires uninterrupted actuation for a predetermined interval of time before it operates; the interval is substantially longer than the time required for actuation of an ordinary quick-acting electromagnetic relay. The actuation of the time delay relay begins just after the pressure valve is operated and permits the application of pressure to move the welding electrodes into engagement with the material to be welded. After this a welding pulse is applied. If the welding pulse is of relatively short duration, no further action takes place during or after the welding current flows. The time delay relay merely continues to be actuated and after its characteristic time expires, it operates and, in turn, causes the valve to operate to release the fluid pressure and to permit the welding electrode to disengage the material. Since the characteristic time period of the time delay relay is substantially longer than the interval during which a welding current pulse of the length just mentioned flows, the disengagement of the electrode from the material takes place a substantial interval of time after the current flow has ceased.

If, on the other hand, the welding current pulse is of substantial length, another relay is operated by the flow of the welding current. The latter relay causes the actuation of the time delay relay to be interrupted. Since the latter relay remains in its operated condition as long as the welding current pulse now flows, the time delay relay remains in an unactuated condition until the current pulse has ceased flowing. When the welding current has ceased to flow, the second relay is deenergized and the actuation of the time delay relay again commences. The latter now operates at the end of its characteristic time period causing the movable welding electrode to disengage the material. In this case, the disengagement again takes place after the flow of welding current has ceased.

It is seen that the time delay relay as used has two functions; it remedies the situation which arises in the prior art arrangement when the welding time is so short that the relay across the welding load fails to operate and it provides for a definite minimum period of dwell. This period is substantially the same in all cases, i. e., it is the characteristic time of the time delay relay. The maximum deviation which may arise in this period is less than the time required for the relay across the welding load to pick up.

Figure 2:
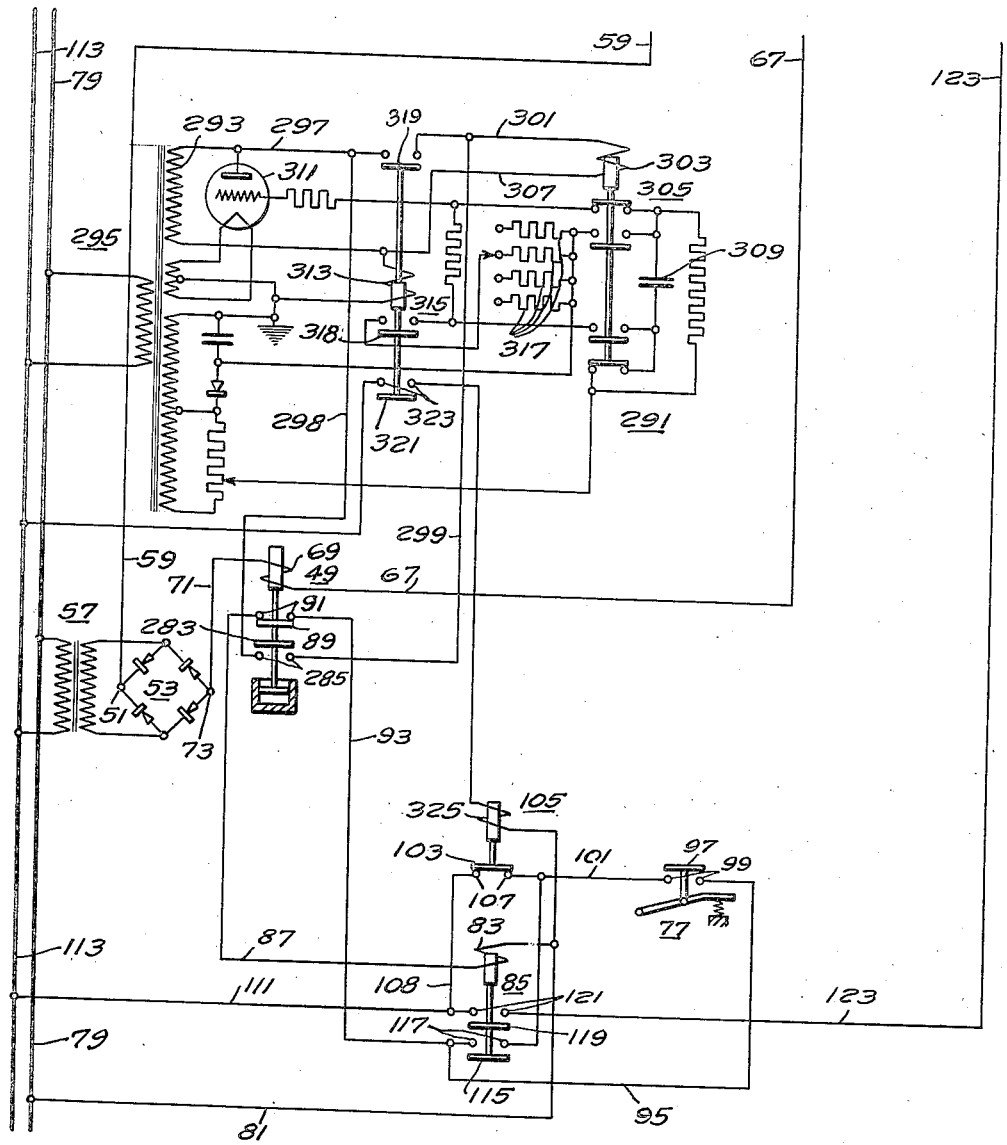

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawings, in which Figures 1 and 2 together constitute a diagrammatic view showing a preferred embodiment of my invention.

The apparatus shown in the drawings comprises a welding transformer 3, the secondary 5 of which is connected to a pair of welding electrodes 7 and 9. One of the welding electrodes 7 is fixed while the other one 9 is movable in a direction transverse to the material 11 to be welded in and out of engagement with the material. The movement of the latter electrode takes place under the action of fluid pressure, preferably compressed air.

The flow of the compressed air is controlled by an electromagnetically actuated valve 13 held closed by a spring 15 and opened by the action of a solenoid 17. When the valve 13 is opened, air flows into a piston chamber 19 and there causes a piston 21 carrying the movable welding electrode 9 to move upwardly against the action of another spring 23 carrying the electrode into engagement with the work 11. After the movable electrode 9 has engaged the work, the back pressure of the air actuates a back switch 25 by operating on a second piston 27 carrying the movable contactor 29 of the switch and the latter initiates a welding operation.

The primary 31 of the welding transformer 3 is supplied from an alternating current source 33 of the ordinary commercial 60-cycle type. The power is preferably supplied through a valve system comprising a pair of electric discharge devices 35 and 37 of the mercury-pool immersed-ignition-electrode type connected in anti-parallel. To properly time the flow of current, the supply of initiating impulses to the ignition electrodes 39 of the discharge devices is controlled through a system including an auxiliary discharge device 41 for starting the current flow, an auxiliary discharge device 43 for stopping the current flow and a pair of initiating auxiliary electric discharge devices 45 and 47 through which current flows to the initiating electrodes.

When the current pulse supplied to the material 11 to be welded is relatively short, the time delay relay 49 which may be of any general type such as the so-called Westinghouse AT relay or a motor operated contact device prevents the air valve solenoid 17 from becoming deenergized to effect the closing of the air valve 13 and release the movable electrode from engagement with the material. In the preferred practice of my invention, the time delay relay 49 is of the type that is operated in one sense immediately on being energized, but must be maintained deenergized for an uninterrupted interval of time to be operated in the opposite sense. Normally, the time delay relay 49 is maintained energized in a circuit extending from the positive terminal 51 of a Graetz connected bridge rectifier 53 supplied from the main source 33 through a pair of transformers 55 and 57, through a conductor 59, a conductor 61, the lower movable contactor 63 of an auxiliary relay 65 which is normally deenergized, a conductor 67, the exciting coil 69 of the time delay relay 49, a conductor 71 to the negative terminal 73 of the rectifier. The energization of the auxiliary relay 65 is controlled by the back switch 25. When the welding current pulses are of relatively long duration, the premature operation of the time delay relay 49 is prevented by another relay 75 energized by the flow of welding current.

The welding operation is started by the closing of a manually actuable switch 77 which is preferably a foot switch. When the switch 77 is closed, a circuit is completed which extends from a supply conductor 79 energized from the main source through the transformer 55, through a conductor 81, the exciting coil 83 of a relay 85 used for locking the system in independently of the foot switch, a conductor 87, the upper movable contactor 89 of the time delay relay 49 which is normally in engagement with a pair of corresponding fixed contacts 91, a conductor 93, a conductor 95, the movable contactor 97 of the foot switch now in engagement with a pair of corresponding fixed contacts 99, a conductor 101, the movable contactor 103 of another relay 105 which prevents multiple operation with the foot switch closed and which is engaged with corresponding fixed contacts 107, a conductor 108, a conductor 111 to the other supply conductor 113 energized from the main source.

The lock-in relay 85 is now operated and its lower movable contactor 115 engages corresponding fixed contacts 117 bridging contacts 99 of the foot switch 77 and thus rendering the system independent of the manner of operation of the foot switch. The upper movable contactor 119 of the lock-in relay 85 also engages a pair of corresponding fixed contacts 121 and closes a circuit extending from the supply conductor 113 through a conductor 111, the upper movable contactor 119 of the relay 85, a conductor 123, the exciting solenoid 17 of the air valve 13, a conductor 125, a conductor 127 to the other supply conductor 79.

The air valve 13 is now operated and compressed air is supplied through the valve to the movable electrode piston 21 moving the welding electrode 9 into engagement with the material 11 to be welded. After the electrode 9 has been properly engaged with the material, the back pressure of the air operates the back switch 25 closing a circuit extending from the supply conductor 79 through the conductor 127, the movable contactor 29 of the back switch 25, a conductor 129, the exciting coil 131 of the auxiliary relay 65 controlling the time delay relay 49, a conductor 133, a conductor 135, a conductor 137 to the other line conductor 113. The auxiliary relay 65 is now operated and its lower contactor 63 becoming disengaged from the corresponding fixed contacts 139 interrupts current flow to the exciting coil 69 of the time delay relay. However, the time delay relay 49 must remain deenergized uninterruptedly for at least a predetermined interval of the time before it operates and, therefore, no change in the circuits controlled by this relay occur for the present in spite of the operation of the auxiliary relay.

The upper movable contactor 141 of the auxiliary relay 65 engages a pair of fixed contacts 143 and closes a circuit extending from the supply conductor 79 through the conductor 127, a conductor 145, the upper movable contactor 141 of the auxiliary relay, a conductor 147, the exciting coil 149 of a relay 151 for initiating the operation of the timer for the welding current, the conductor 135, the conductor 137, to the other line conductor 113. The timer relay 151 is now operated and its lowest movable contactor 153 engages corresponding fixed contacts 155 to connect across a resistor 157 the secondary 159 of the output transformer 161 of a circuit 163 for triggering off the timer to release the flow of welding current precisely at the desired instant.

The trigger circuit 163 comprises an electric discharge device 165 which is preferably of the gaseous type having an anode 167, a cathode 169 and a control electrode 171. The control electrode 171 is connected to the cathode 169 through the output terminals 173 and 175 of a phase shifting network 177 of the usual type. The anode 167 of the discharge device 165 is connected to the cathode 169 through the primary 179 of the output transformer 161 and a portion of the windings 181 of the secondary section 183 of the transformer 185 whereby the trigger circuit is supplied. Since it is desired that the supply of welding current be triggered-off precisely, the output transformer 161 is preferably of the impulsing type in which the potential output waves of the secondary are of short duration compared to the potential supplied to the primary.

The resistor 157 which is connected in circuit with the secondary 159 of the output transformer 161 by the lowest movable contactor 153 of the timer relay 151 is permanently connected between the control electrode 187 and the cathode 189 of the starting auxiliary discharge device 41. The circuit extends from the control electrode 187 through a grid resistor 191, a conductor 193, the resistor 157, a conductor 195, a rectifier bridge 197, supplied from the main source, which provides a negative bias normally maintaining the starting device 41 non-conductive, a conductor 199, a rheostat 201, to the cathode 189 of the auxiliary device.

When the timer relay 151 is operated, one of its intermediate movable contactors 203 engages corresponding fixed contacts 205, closing the anode circuit of the starting auxiliary device and incidentally also the anode circuit of the stopping auxiliary device 43. The circuit for the starting device 41 extends from the positive terminal 207 of a voltage divider 209, supplied from a rectifier bridge 211 energized from the main source, through a conductor 213, the intermediate movable contactor 203 of the relay 151, the anode 215 and the cathode 189 of the starting device 41, the rheostat 201, the conductor 199 to the negative terminal 217 of the voltage divider.

After the circuit through the trigger resistor 157 is closed potential impulses are impressed across the resistor and the impulses are transferred to the control circuit of the starting device 41. When an impulse of positive polarity is thus impressed in its control circuit, the starting device 41 is rendered conductive and current flows through the rheostat 201.

The rheostat 201 is provided with an intermediate tap 219 which is connected to the control electrodes 221 of the auxiliary discharge devices 45 and 47 through which the initiating current is supplied through the initiating electrodes 39 of the main discharge devices 35 and 37. The latter circuit extends from the intermediate tap 219 through a conductor 223 to the intermediate tap 225 of the secondary 227 of a compensating transformer 229 connected between the control electrodes 221. The circuit then divides and extends through the windings of the secondary 227 and grid resistors 231 to the control electrodes 221 of the initiating devices, thence through the cathodes 232 of the initiating devices 45 and 47, conductors 233, the initiating electrodes 39 of the main discharge devices 35 and 37, the cathodes 234 of the main devices to the movable tap 235 of a voltage divider 237 interconnecting the cathodes 234, common to the divided branches of the circuit, then through a conductor 239 connected to the movable tap 235, a conductor 241 the movable tap 243 of the voltage divider 209, whereby current is supplied to the starting device 41, the lower winding of the voltage divider, the negative terminal 217 of the voltage divider, the conductor 199, to the rheostat 201. It is to be noted that when current is not flowing through the rheostat 201, the initiating auxiliary devices 45 and 47 are maintained non-conductive by the negative potential impressed between their control electrodes 221 and their cathodes 232 by voltage divider 209 between its points 217 and 243. However, when the starting device 41 is conductive, current flows through the rheostat 201 and a potential is impressed between the control electrodes 221 and the cathodes 232 of the initiating devices 45 and 47 which counteracts the negative potential and the latter are rendered conductive to supply current through the initiating electrodes 39 of the main devices.

The current flow through the left-hand initiating device takes place in a circuit extending from the lower terminal of the source 33 through a conductor 245, a conductor 247, a conductor 249, a conductor 251 connected to the latter conductor 249 by the upper movable contactor 253 now engaged with cooperative fixed contacts 254 of the timer relay 151, a current limiting resistor 255, the anode 257 and the cathode 232 of the initiating device, the conductor 233, the initiating electrode 39 of the left-hand main discharge device 35, the cathode 234 of the latter device, a conductor 259, a conductor 261, the primary 31 of the welding transformer 3, a conductor 263 to the upper terminal of the source 33. A similar circuit may be traced for the right-hand initiating discharge device 47 through another movable contactor 265 of the timer relay 151 which is also closed when the relay is operated.

As the alternating potential supplied from the source 33 becomes alternately positive for each of the initiating discharge devices 45 and 47 and the corresponding main discharge devices 35 and 37, the discharge devices 45 and 35 and 47 and 37 are alternately rendered conductive, half waves of current flow through the primary 31 of the welding transformer 3 and current is supplied to the material 11 to be welded. The supply of current continues until a variable capacitor 267 connected in parallel with the rheostat 201 through a suitable variable resistor 269 is charged.

The variable capacitor 267 is also connected between the control electrode 271 and the cathode 273 of the stopping auxiliary device 43 in a circuit extending from the control electrode 271 of the latter device through a grid resistor 274, the capacitor 267, the conductor 199, the portion of the windings of the voltage divider 209 between the negative terminal 217 and the movable tap 243, the conductor 241 to the cathode 273 of the stopping device. The polarity of the potential impressed on the capacitor 267 by charging it is such that the positive potential of the control electrode 271 of the auxiliary device 43 is increased and the biasing potential supplied between the negative terminal 217 and the movable tap 243 of the voltage divider 209 is counteracted. The stopping device is now rendered conductive and current flows in a circuit extending from the positive terminal 207 of the voltage divider 209 through the intermediate movable contactor 203 of the timer relay 151, the anode 275 and cathode 273 of the stopping device 43 to the movable tap 243 of the voltage divider. The movable tap 243 of the voltage divider 209 is thus again connected to the conductor 239 leading to the movable tap 235 of the voltage divider 237 interconnecting the cathodes 234 of the main discharge devices 35 and 37 and the original negative potential is now again supplied between the control electrodes 221 and the cathodes 232 of the initiating auxiliary discharge devices 215 and 47. The latter are then rendered non-conductive and the flow of welding current is interrupted.

Depending on the setting of the variable capacitor 267 and the variable resistor 269 in series therewith, the welding current flows for a longer or a shorter time. If it flows for a relatively short time of the order of from one-half period to one and one-half periods of the source, no further change takes place in the system until the time delay relay 49 operates since the lower movable contactor 63 of the auxiliary relay 65 is still disengaged from its fixed contacts 139. The characteristic time period of the latter relay is, of course, set at such a value that this occurs at some time after the flow of welding current has stopped.

If, however, the welding pulse persists for several periods of the source, as is often the case, the welding current responsive relay 75, the exciting coil 277 of which is connected directly across the welding primary 31, is operated and its movable contactor 279 engages corresponding fixed contacts 281 bridging the contacts 139 of the auxiliary relay 65 and reenergizing the time delay relay 49. The time delay relay 49 now is held in its initial energized condition as long as welding current continues to flow. When the flow of welding current finally ceases, the welding current responsive relay 75 is deenergized and operates to open the energizing circuit for the time delay relay 49. The timing of the latter then again commences and after a predetermined interval of time it now operates, disengaging the upper movable contactor 89 from the corresponding fixed contacts 91 and engaging the lower movable contactor 283 with a pair of corresponding fixed contacts 285.

The lock-in relay 85 is deenergized by the disengagement of the upper movable contactor 89 of the time delay relay 49 and the two circuits through its contactors 115 and 119 are opened. The circuit held closed by the upper movable contactor 119 through the solenoid 17 of the air valve 13 is thus opened and the supply of air is interrupted while the air under the electrode piston 21 is permitted to exhaust. The piston 21, therefore, moves downwardly disengaging the movable electrode 9 from the material 11 to be welded. At the same time, the back pressure switch 25 is also opened and the auxiliary relay 65 deenergized. The lower movable contactor 63 of the latter relay now reengages the corresponding fixed contacts 139 reenergizing the time delay relay 49 and operating it in preparation for another welding operation. The upper movable contactor 141 disengages its corresponding fixed contacts 143 opening the exciting circuit for the timer relay 151 and causing the latter to operate. The circuits for the starting and stopping auxiliary devices 41 and 43 and for the initiating devices 45 and 47 are now open. In addition, an intermediate movable contactor 287 of the timer relay engages corresponding fixed contacts 289 to provide a discharging circuit for the variable capacitor 267.

Since the system is manually operable, it may happen that the operator actuates the foot switch 77 accidentally just after the time delay relay 49 has operated and has been reverted to the energized condition. To prevent the flow of deleterious welding current by the accidental operation of the switch 77, an electronic timing relay 291 is provided. This relay is described in detail in my Patent No. 2,008,413 for Electric discharge apparatus, dated July 16, 1935, and assigned to the assignee of the present application.

The operation of the relay 291 is initiated by the engagement of the lower movable contactor 283 of the time delay relay 49 with its fixed contacts 285. A circuit is thus closed which extends from the upper terminal of a secondary section 293 of the transformer 295 whereby the electronic relay is supplied, through a conductor 297, a conductor 298, the closed contactor 283 of the time delay relay 49, a conductor 299, a conductor 301, the exciting coil 303 of a grid control relay 305 in the electronic timer circuit, a conductor 307 to the lower terminal of the secondary section. The grid control relay 305 operates, reversing the connections of a capacitor 309 which is normally charged through the grid circuit of the discharge device 311 of the electronic timer 291 to a potential such that it biases the discharge device to a non-conductive condition. By the reversal of the capacitor connections, the effect of the capacitor potential is reversed and the discharge device 311 is rendered conductive.

A circuit is now closed which extends from the upper terminal of the secondary section 293 through the discharge device 311, the exciting coil 313 of the main relay 315 of the timer, the conductor 307, to the lower terminal of the secondary section. The latter relay 315 is energized and immediately operates and it remains in its operated condition as long as the capacitor continues sufficiently charged to maintain the discharge device 311 energized. This condition is controlled by a plurality of resistors 317 of different magnitudes one of which may be selected and connected through contactor 318 to the capacitor 309 for any desired timing when the capacitor connections are reversed. The capacitor 309 discharges through the selected resistor 317 and when it has discharged the discharge device is rendered non-conductive and the relay is deenergized. The relay 315 is, moreover, provided with an upper movable contactor 319 which bridges the lower contacts 285 of the time delay relay 49 and thus maintains the grid control relay 305 energized and the electronic timer 291 inoperative after the time delay relay has been reenergized.

The lower movable contactor 321 of the main timer relay 315 on the other hand engages corresponding fixed contacts 323 and closes a circuit through the exciting coil 325 of the multiple-operation preventing relay 105. The latter is energized and its movable contactor 103 disengages the corresponding fixed contacts 107, maintaining the circuits through the foot switch 77 open. The latter condition persists for a time period determined by the electronic timer 291 which is adjustable at will by simply selecting the proper resistance through which the capacitor is discharged. Supply of welding current to the system by accidental operation of the foot switch 77 is thus prevented for at least a predetermined interval of time. After the electronic timer completes its operation, the relay 105 is again deenergized closing the circuits through the foot switch 77 and the whole system is reset for another operation.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for welding a material with a system including electrodes through which current is to be transmitted to said material comprising means for moving said electrodes into engagement with said material and holding them in the said engagement, means for supplying an impulse of current to weld said material, a first means to prevent the disengagement of said electrodes from said material until the termination of said impulse when said impulse is of relatively long duration said first means being of the type that fails to function if said impulse is of relatively short duration and a second means for preventing the disengagement of said electrodes from said material when said impulse is of relatively short duration.

2. For use with apparatus for welding a material with a welding system including electrodes through which current is to be transmitted to weld said material and means for moving said electrodes into engagement with said material and holding them in the said engagement, the combination comprising means for supplying an impulse of current to weld said material, a first means to prevent the disengagement of said electrodes from said material until the termination of said impulse when said impulse is of relatively long duration said first means being of the type that fails to function if said impulse is of relatively short duration and a second means to prevent the disengagement of said electrodes from said material when said impulse is of relatively short duration.

3. For use with apparatus for welding a material with a welding system including electrodes through which current is to be transmitted to weld said material and means for moving said electrodes into engagement with said material and holding them in the said engagement, the combination comprising means for supplying an impulse of current to weld said material, a first means including electromagnetic actuating means to prevent the disengagement of said electrodes from said material until the termination of said impulse when said impulse is of sufficiently long duration to permit actuation of said first means, and a second means to prevent the disengagement of said electrodes from said material when said impulse is of insufficient duration to permit actuation of said first means.

4. For use with apparatus for welding a material with a welding system including electrodes through which current is to be transmitted to weld said material and means for moving said electrodes into engagement with said material and holding them in the said engagement, the combination comprising means for supplying an impulse of current to weld said material, a first means responsive to the flow of said impulse of current to prevent the disengagement of said electrodes from said material until the termination of said impulse when said impulse is of predetermined duration, and a second means to prevent the disengagement of said electrodes from said material when said impulse is of shorter duration than said predetermined duration.

5. For use with apparatus for welding a material with a welding system including electrodes through which current is to be transmitted to weld said material and means for moving said electrodes into engagement with said material and holding them in the said engagement, the combination comprising means for supplying an impulse of current to weld said material, a first means to prevent the disengagement of said electrodes from said material until the termination of said impulse when said impulse is of relatively long duration and a second means to prevent the disengagement of said electrodes from said material when said impulse is of relatively short duration, the actuation of said first means operating to prevent the actuation of said second means.

6. Apparatus for welding a material with a system including electrodes through which current is to be transmitted to said material comprising means including a manually actuable device for moving said electrodes into engagement with said material and holding them in the said engagement, means for supplying an impulse of current to weld said material, a first means to prevent the disengagement of said electrodes from said material until the termination of said impulse when said impulse is of relatively long duration said first means being of the type that fails to function if said impulse is of relatively short duration and a second means for preventing the disengagement of said electrodes from said material when said impulse is of relatively short duration, said first and said second means operating to perform their respective functions regardless of whether or not said manually actuable device remains actuated after having once being actuated.

7. Apparatus for supplying current to a load from a source, comprising valve means interposed between said source and said load operating to limit the current flow to pulses persisting for a predetermined interval of time that may be set at will, a device to be actuated in one sense prior to the initiation of each one of said pulses and to be actuated in the opposite sense after the termination of each one of said pulses and prior to the initiation of a succeeding pulse, a first means to prevent the actuation of said device in said opposite sense until after the termination of a pulse if said pulse persists for at least a first predetermined interval of time, said first means being of the type that, when acting alone, it functions to prevent the actuation of said device in said opposite sense for a second predetermined interval of time after the initiation of said pulse and a second means to prevent the actuation of said device in said opposite sense until after the termination of said pulse if said pulse persists for an interval of time larger than said first predetermined interval.

8. Apparatus for supplying current to a load from a source, comprising valve means interposed between said source and said load operating to limit the current flow to pulses persisting for a predetermined interval of time that may be set at will, a device to be actuated in one sense prior to the initiation of each one of said pulses and to be actuated in the opposite sense after the termination of each one of said pulses and prior to the initiation of a succeeding pulse, a first electromagnetic relay requiring actuation for an uninterrupted interval of time of predetermined length before it is operated, functioning when operated to actuate said device in the opposite sense, the actuation of said relay commencing prior to the flow of a current pulse following the actuation of said device in said one sense, and a second electromagnetic relay connected to be actuated by the flow of said current pulses, said second relay when actuated operating to interrupt the actuation of said first relay.

9. Apparatus for supplying current to a load from a source, comprising valve means interposed between said source and said load operating to limit the current flow to pulses persisting for a predetermined interval of time that may be set at will, a device to be actuated in one sense prior to the initiation of each one of said pulses and to be actuated in the opposite sense after the termination of each one of said pulses and prior to the initiation of a succeeding pulse, a first electromagnetic relay requiring actuation for an uninterrupted interval of time of predetermined length before it is operated, functioning when operated to actuate said device in the opposite sense, the actuation of said relay commencing prior to the flow of a current pulse following the actuation of said device in said one sense, and a second electromagnetic relay connected to be actuated by the flow of said current pulses, said second relay when actuated operating to interrupt the actuation of said first relay, the length of said interval of time being substantially greater than the time required for operation of said second relay after it is actuated by the flow of said current pulse.

10. Apparatus for supplying current to a load from a source, comprising valve means interposed between said source and said load operating to limit the current flow to pulses persisting for a predetermined interval of time that may be set at will, a device to be actuated in one sense prior to the initiation of each one of said pulses and to be actuated in the opposite sense after the termination of each one of said pulses and prior to the initiation of a succeeding pulse, a first electromagnetic relay requiring actuation for an uninterrupted interval of time of predetermined length before it is operated, functioning when operated to actuate said device in the opposite sense, manually actuable means for first actuating said device in said one sense and before the flow of a current pulse, commencing the actuation of said first relay and a second electromagnetic relay connected to be actuated by the flow of said current pulses, said second relay when actuated operating to interrupt the actuation of said first relay.

11. Apparatus for supplying current to a load from a source, comprising valve means interposed between said source and said load operating to limit the current flow to pulses persisting for a predetermined interval of time that may be set at will, a device to be actuated in one sense prior to the initiation of each one of said pulses and to be actuated in the opposite sense after the termination of each one of said pulses and prior to the initiation of a succeeding pulse, a first electromagnetic relay requiring actuation for an uninterrupted interval of time of predetermined length before it is operated, functioning when operated to actuate said device in the opposite sense, manually actuable means for first actuating said device to operate in said one sense and then, before the flow of a current pulse, commencing the actuation of said first relay, a second electromagnetic relay connected to be actuated by the flow of said current pulses, said second relay when actuated operating to interrupt the actuation of said first relay and means to prevent the reactuation of said device in said one sense for at least a length of time predeterminable at will regardless of whether or not said manually actuable means is actuated.

12. For use with apparatus for welding a material with a welding system including electrodes through which current is to be transmitted to weld said material and means for moving said electrodes into engagement with said material and holding them in the said engagement, the current flow through said material at times persisting only for a short interval of time of the order of a cycle of a 60 cycle source, the combination comprising means for initiating the supply of an impulse of current to weld said material and means activated by said initiating means substantially when the flow of said welding impulses is initiated, and operating to disengage said electrodes from said material a predetermined interval of time after said impulse has been terminated sufficiently long to enable the weld to chill and harden when said current flow persists only for said short interval.

13. For use with apparatus for welding a material with a welding system including electrodes thru which current is to be transmitted to weld said material and means for moving said electrodes into engagement with said material and holding them in the said engagement, the combination comprising means for initiating the supply of an impulse of current to weld said material and means activated substantially when the flow of said welding impulse is initiated by said initiating means, and operating to disengage said electrodes from said material a predetermined interval of time, sufficiently long to enable the weld to chill and harden, after said impulse has been terminated, said activated means including means for preventing the premature operation thereof when said impulse is of substantial length.

14. Apparatus according to claim 13 characterized by the fact that the activated means includes a time delay relay and a relay operated in response to the flow of welding current which lengthens the delay period of the time delay relay substantially by the time length of the welding impulse.

JOHN W. DAWSON.